(12) United States Patent
Fu et al.

(10) Patent No.: US 11,802,970 B2
(45) Date of Patent: Oct. 31, 2023

(54) ALTERNATING POWER-LEVEL SCANNING FOR TIME-OF-FLIGHT LIDAR SYSTEMS

(71) Applicant: Aptiv Technologies Limited, St. Michael (BB)

(72) Inventors: Geng Fu, Belmont, MA (US); Denis Rainko, Essen (DE); Ali Haddadpour, Boston, MA (US); Roman Dietz, Berlin (DE)

(73) Assignee: Aptiv Technologies Limited, St. Michael (BB)

( * ) Notice: Subject to any disclaimer, the term of this patent is extended or adjusted under 35 U.S.C. 154(b) by 731 days.

(21) Appl. No.: 16/924,027

(22) Filed: Jul. 8, 2020

(65) Prior Publication Data

US 2022/0011433 A1 Jan. 13, 2022

(51) Int. Cl.
*G01S 7/481* (2006.01)
*G01S 17/894* (2020.01)
*G01S 17/931* (2020.01)

(52) U.S. Cl.
CPC .......... *G01S 17/894* (2020.01); *G01S 7/4817* (2013.01); *G01S 17/931* (2020.01)

(58) Field of Classification Search
CPC .................................................. G01S 7/4817
See application file for complete search history.

(56) References Cited

U.S. PATENT DOCUMENTS

| | | | |
|---|---|---|---|
| 10,241,208 B2 | 3/2019 | Osiroff et al. | |
| 10,310,088 B2 | 6/2019 | Elooz et al. | |
| 10,353,075 B2 | 7/2019 | Buskila et al. | |
| 2016/0164261 A1* | 6/2016 | Warren | H04N 23/11 372/50.122 |
| 2017/0269197 A1* | 9/2017 | Hall | G01S 17/89 |
| 2018/0284244 A1 | 10/2018 | Russell et al. | |
| 2019/0107606 A1 | 4/2019 | Russell et al. | |
| 2019/0162823 A1* | 5/2019 | Eckstein | G01S 7/4814 |
| 2020/0158876 A1* | 5/2020 | Karadeniz | G05D 1/0088 |
| 2021/0003706 A1* | 1/2021 | Hwangbo | G01S 7/4868 |
| 2021/0215801 A1* | 7/2021 | Reppich | G01S 7/4814 |
| 2021/0389467 A1* | 12/2021 | Eshel | G01S 17/931 |

OTHER PUBLICATIONS

"Extended European Search Report", EP Application No. 21183610.1, dated Dec. 2, 2021, 12 pages.

* cited by examiner

*Primary Examiner* — Yuqing Xiao
*Assistant Examiner* — Zhengqing Qi
(74) *Attorney, Agent, or Firm* — Sawtooth Patent Group PLLC

(57) ABSTRACT

This document describes techniques and systems to alternate power-level scanning for ToF lidar systems. The described lidar system transmits an initial signal having a first power level of an alternating pattern of power levels. The initial signal is associated with an initial pixel of consecutive pixels. The lidar system then transmits a subsequent signal, which is associated with a subsequent pixel of the consecutive pixels, having a second power level. The transmission of the initial signal and the subsequent signal with the alternating pattern of power levels limits a total power level emitted by the lidar system during a time interval to comply with safety regulations. The alternating pattern of power levels also permits the lidar system to switch between a long-detection range and a short-detection range for consecutive pixels.

18 Claims, 7 Drawing Sheets

ALTERNATING POWER-LEVEL SCANNING FOR TIME-OF-FLIGHT LIDAR SYSTEMS

BACKGROUND

Automotive time-of-flight (ToF) lidar systems use laser signals to determine the speed and distance of stationary and moving objects (e.g., other vehicles, pedestrians, obstacles). Lidar systems compare emitted transmit signals to reflected return signals to make these measurements. For many applications, it is desirable to provide a long-range detection capability. For time-of-flight lidar systems in particular, providing a long-range detection capability with a high frame rate can require optical power outputs that exceed safety regulations for certain exposure times.

SUMMARY

This document describes techniques and systems to alternate power-level scanning for ToF lidar systems.

For example, this document describes a transmitter of a ToF lidar system maintaining an alternating pattern of power levels including a first power level and a second power level. During an initial frame of consecutive frames, the described transmitter emits an initial signal of consecutive signals having the first power level from the alternating pattern of power levels. The initial signal is emitted during a first interval and is associated with an initial pixel of consecutive pixels. The transmitter then emits a subsequent signal of the consecutive signals, which is emitted during a second interval and is associated with a subsequent pixel of the consecutive pixels. The second signal has the second power level from the alternating pattern of power levels. The emission of the consecutive signals with the alternating pattern of power levels is effective to limit a total power level emitted by the lidar system during a third interval. The third interval comprises at least a portion of the first interval and at least a portion of the second interval.

This document also describes methods performed by the above-summarized system and other methods set forth herein, as well as means for performing these methods.

This summary introduces simplified concepts to alternate power-level scanning for ToF lidar systems, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of alternating power-level scanning for ToF lidar systems are described in this document with reference to the following figures. The same numbers are often used throughout the drawings to reference like features and components:

FIG. 3-1 illustrates an example operation of a ToF lidar system with alternating power-level scanning;

FIG. 3-2 illustrates the pixels scanned by a ToF lidar system during a frame;

DETAILED DESCRIPTION

Overview

Figure 1:
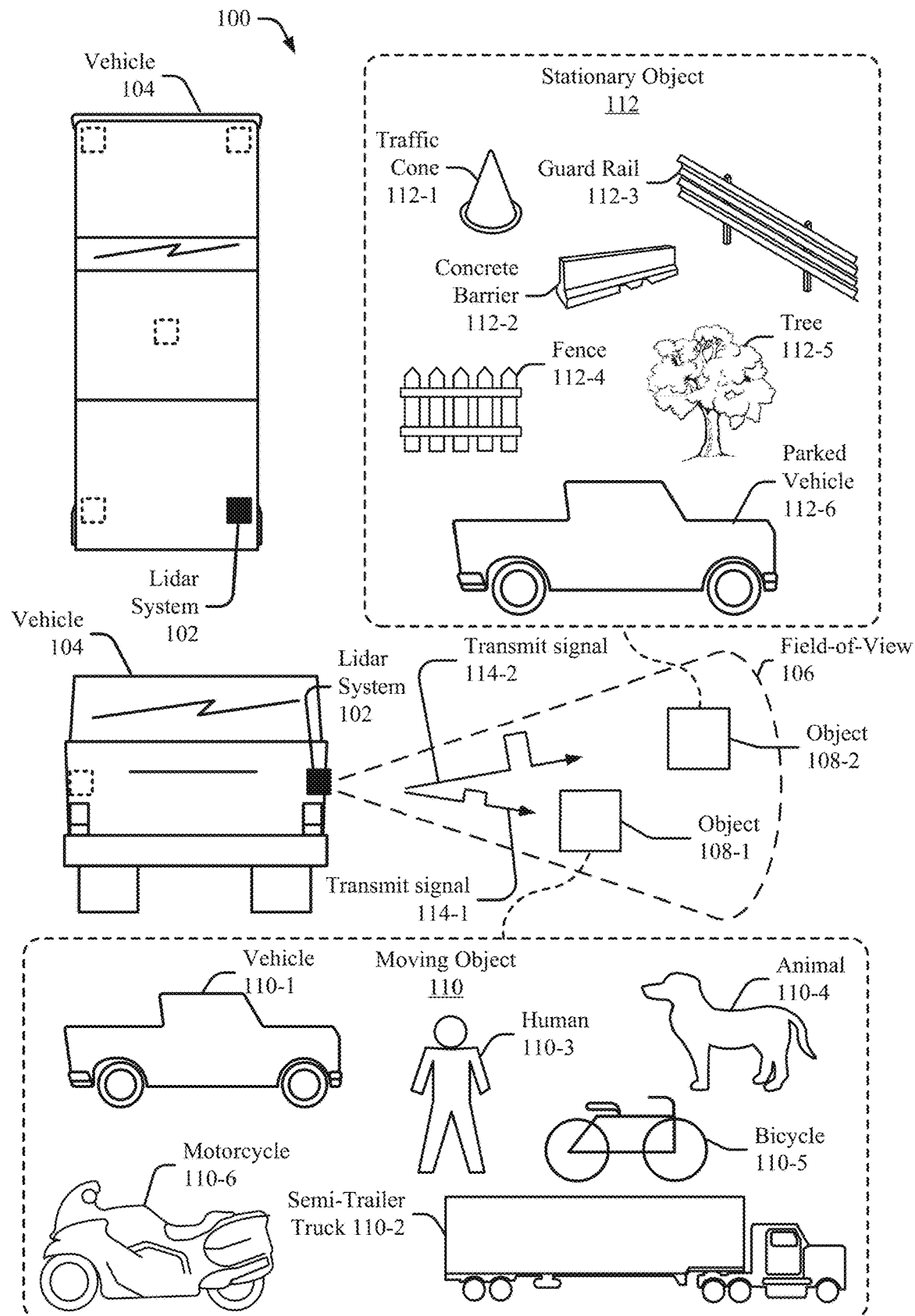
FIG. 1 illustrates an example environment in which a ToF lidar system with alternating power-level scanning can be implemented.

Automotive lidar systems are an important sensing technology that some vehicle-based systems rely on to acquire critical information about the surrounding environment. A lidar system has a field-of-view that represents a volume of space within which it looks for nearby objects. The field-of-view is composed of a large number of pixels (e.g., one million pixels). The time it takes the lidar system to scan every pixel (e.g., collect information for all of the pixels) within the field-of-view is a frame. By scanning each pixel in a sequence of frames, a ToF lidar system can determine range and reflectivity information of nearby objects.

A ToF lidar system scans each pixel by emitting a laser signal and detecting a reflection of the laser signal. Depending on the application, lidar systems can be subject to safety regulations on the amount of optical power that can be emitted over a certain time interval. For example, lidar systems in automotive applications can be regulated to maintain their optical power limit below a certain threshold (e.g., 1 mW) for a given time period (e.g., 4 microseconds). A ToF lidar system can generally scan each pixel in 1-3 microseconds. As a result, the regulatory limits on optical power in automotive applications can constrain the optical power of the emitted laser signals for two or more consecutive pixels. Such regulatory limits avoid damaging the eyesight of nearby individuals. Because the detection range is generally proportional to the optical power of the emitted signal, compliance with safety regulations can limit the detection range of a lidar system. Maintaining a long detection range, while complying with safety regulations on optical power limits, can increase the hardware cost or complexity of a lidar system.

Some lidar systems scan each pixel using a uniform laser signal to maintain the optical power limit of consecutive pixels within the prescribed regulatory limit. For example, if the regulatory time period includes two consecutive pixels, the lidar system transmits a laser signal with no more than half of the regulatory limit for each pixel. The detection range of these lidar systems is reduced for each pixel of the field-of-view.

Other lidar systems scan each pixel with a low optical power signal and then scan pixels within a region-of-interest at a higher optical power. The low-power signal complies with the safety regulations by limiting the power per pixel. These systems increase the detection range for the region-of-interest by emitting a high-power signal. Such lidar system can have a reduced frame rate because the region-of-interest must be scanned twice for each frame: once with the low-power signal and once with the high-power signal. The optical power of the high-power signal for two consecutive pixels within the region-of-interest for a particular frame are still limited by the safety regulations. As a result, the scan rate within the region-of-interest for the high-power signals may also be reduced to comply with the safety regulations. In addition, the beam steering control of these lidar systems can be more complex.

Yet other lidar systems scan each pixel in the field-of-view with a high optical power for an initial frame of consecutive frames and then with a low optical power for a subsequent frame of the consecutive frames. While each pixel is scanned with a long-detection range signal, the power of the high-power frames must be sufficiently low such that consecutive pixels do not exceed the regulatory limit. Elsewise, the optical power or the detection range of the lidar systems must be reduced to avoid exceeding the safety regulation limit for the allotted time period. In addition, additional sensor hardware can be required to process return signals from both the low-power frames and the high-power frames.

In contrast to those lidar systems, this document describes techniques and systems to comply with safety regulations on optical power while maintaining a long detection range and without reducing the scan rate. For example, during an initial frame of consecutive frames, the described lidar system includes a transmitter configured to transmit an initial signal having a first power level from an alternating pattern of power levels. The initial signal is transmitted during a first interval, which is associated with an initial pixel of consecutive pixels. The transmitter is further configured to transmit a subsequent signal having a second power level from the alternating pattern of power levels. The subsequent signal is transmitted during a second interval, which is associated with a subsequent pixel of the consecutive pulses. By transmitting the consecutive pulses with the alternating pattern of power levels, the lidar system limits a total power level of the consecutive pixels. Compliance with safety regulations on power limits can be obtained without requiring additional hardware, reducing the detection range of the lidar system, or reducing its scan rate or frame rate. As a result, a ToF lidar system can provide a vehicle system (e.g., a collision-avoidance system) lidar data for objects in the surrounding environment at a longer range without exceeding safety regulations. The alternating pattern of power levels also permits the ToF lidar system to switch between a long-detection range and a short-detection range for consecutive pixels without requiring additional hardware or a photodetector with an increased dynamic range.

This is just one example of how the described techniques and systems can scan with alternating power levels in ToF lidar systems. This document describes other examples and implementations.

Operating Environment

FIG. 1 illustrates an example environment 100 in which techniques using, and an apparatus including, a ToF lidar system 102 with alternating power-level scanning can be implemented. The ToF lidar system 102 can be referred to simply as "the lidar system 102". In the depicted environment 100, the lidar system 102 is mounted to, or integrated within, a vehicle 104. The lidar system 102 is capable of detecting one or more objects 108-1 and 108-2 that are in proximity to the vehicle 104. Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In some cases, the vehicle 104 can tow or include a trailer or other attachments. In general, manufacturers can mount the lidar system 102 to any moving platform, including moving machinery or robotic equipment.

Figure 2:
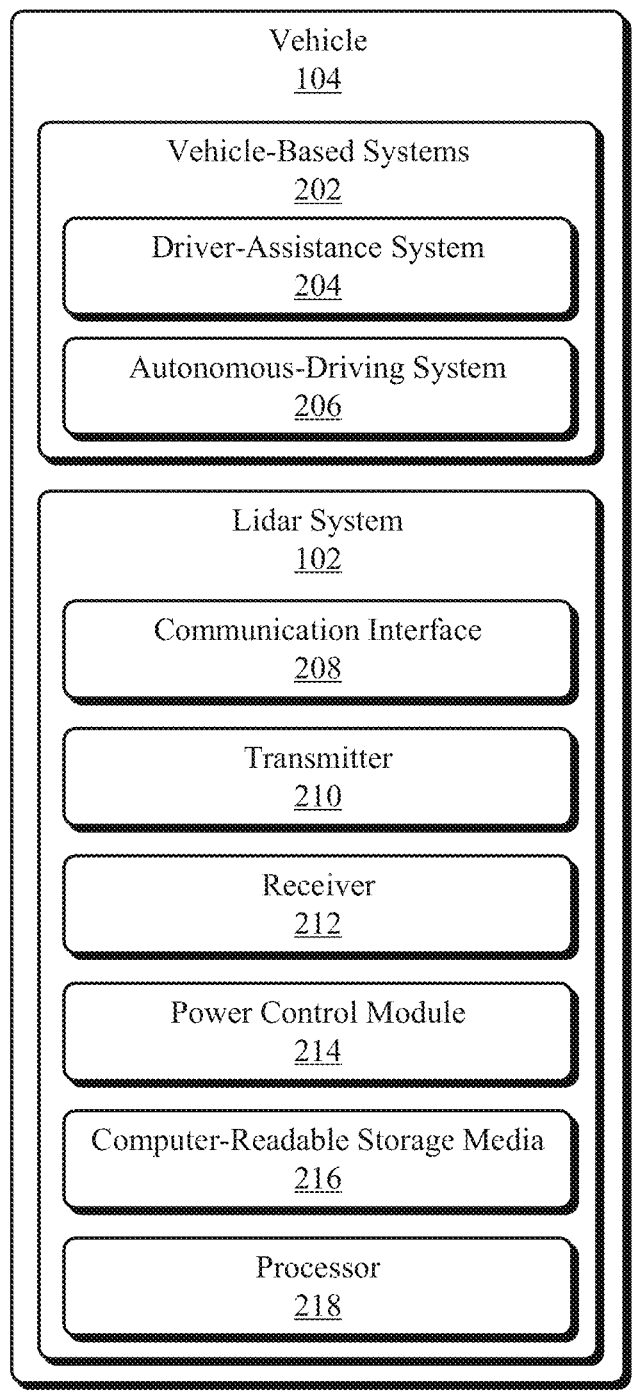
FIG. 2 illustrates an example implementation of the ToF lidar system as part of a vehicle.
Figures 1, 3:
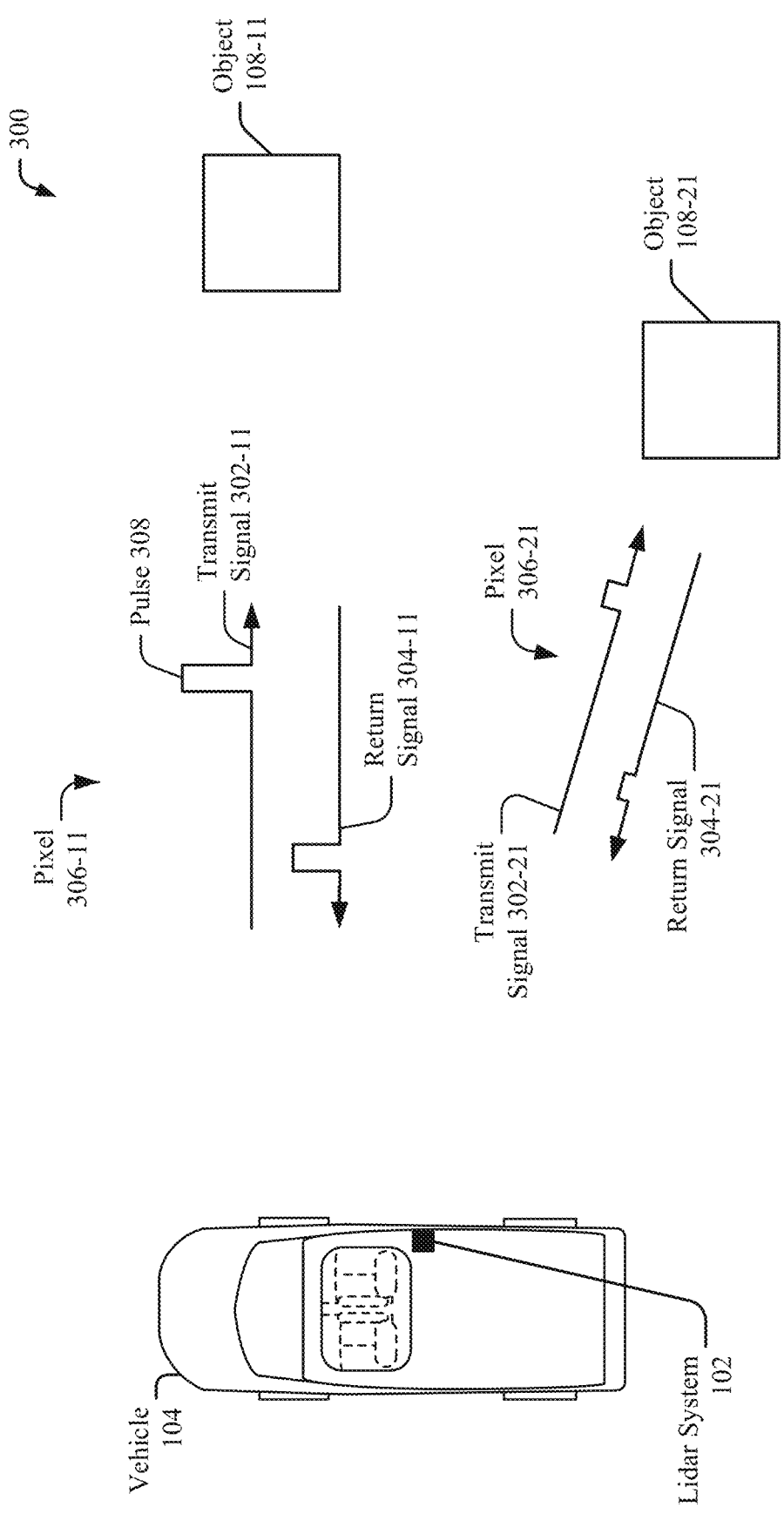
Figures 2, 3:
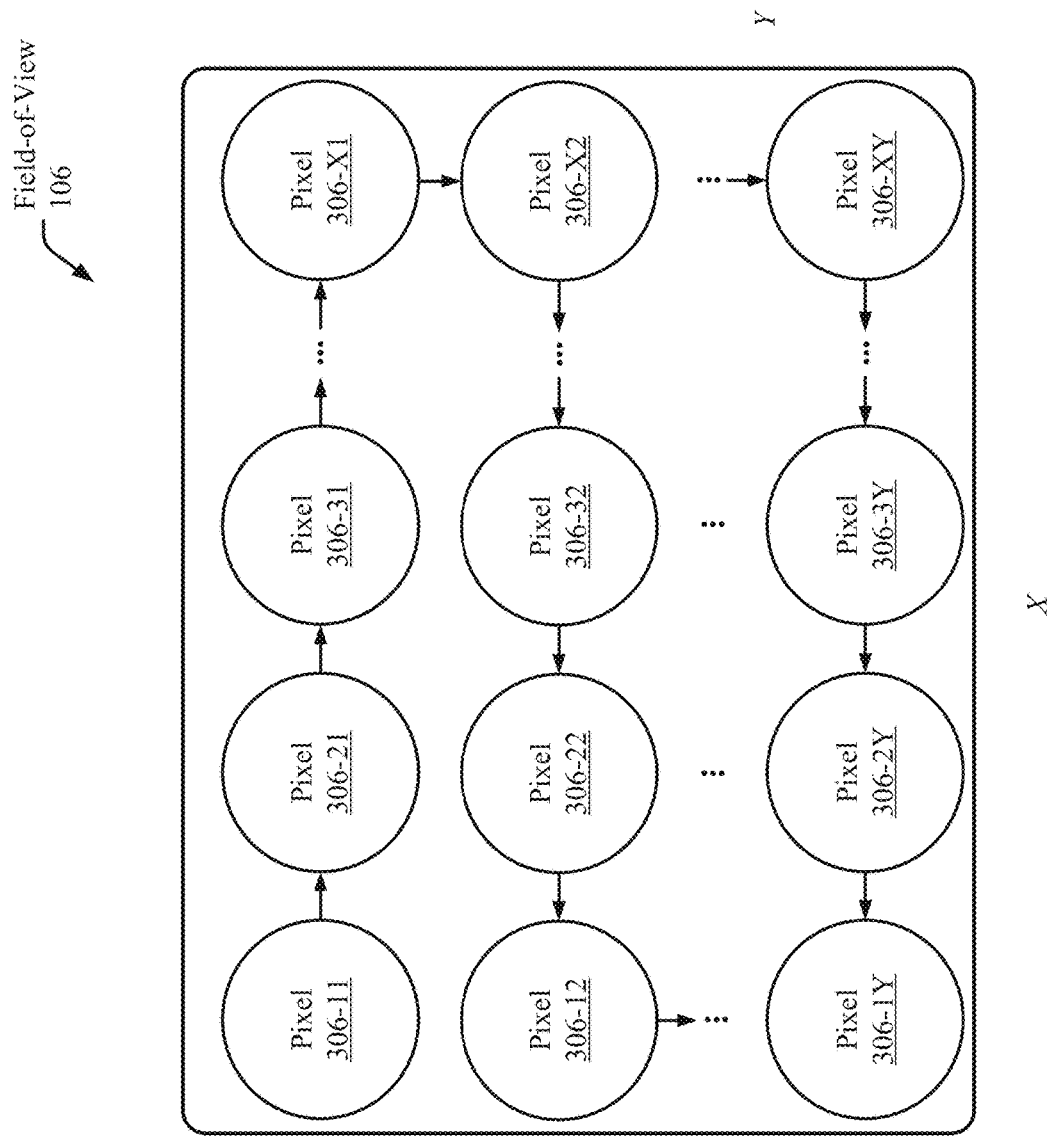

In the depicted implementation, the lidar system 102 is mounted on the side of the vehicle 104 and provides a field-of-view 106 illuminating the objects 108-1 and 108-2. The lidar system 102 divides the field-of-view 106 into pixels (as illustrated in FIG. 3-2). The lidar system 102 can project the field-of-view 106 from any exterior surface of the vehicle 104. For example, vehicle manufacturers can integrate the lidar system 102 into a bumper, side mirror, headlights, rearlights, or any other interior or exterior location where the distance or classification of the object 108 requires detection. In some cases, the vehicle 104 includes multiple lidar systems 102, such as a first lidar system 102 and a second lidar system 102 that together provide a larger field-of-view 106. In general, vehicle manufacturers can design the locations of the one or more lidar systems 102 to provide a particular field-of-view 106 that encompasses a region of interest in which the object 108 may be present. Example fields-of-view 106 include a 360-degree field-of-view, one or more 180-degree fields-of-view, one or more 90-degree fields-of-view, and so forth, which can overlap or be combined into a field-of-view 106 of a particular size.

The objects 108-1 and 108-2 are composed of one or more materials that reflect lidar signals. Depending on the application, the objects 108-1 and 108-2 can represent a target of interest. In some cases, the object 108-1 is a moving object 110, including another vehicle 110-1, a semi-trailer truck 110-2, a human 110-3, an animal 110-4, a bicycle 110-5, or a motorcycle 110-6. In other cases, the object 108-2 represents a stationary object 112, including a traffic cone 112-1, a concrete barrier 112-2, a guard rail 112-3, a fence 112-4, a tree 112-5, or a parked vehicle 112-6. The stationary object 112 can be continuous (e.g., the concrete barrier 112-2, the guard rail 112-3) or discontinuous (e.g., the traffic cone 112-1) along a portion of the road.

The lidar system 102 represents a time-of-flight lidar system, which transmits and receives lidar signals for each pixel of the field-of-view 106. The lidar system 102 measures a distance to the objects 108-1 and 108-2 based on the time it takes for the signals to travel from the lidar system 102 to the objects 108-1 and 108-2, and from the objects 108-1 and 108-2 back to the lidar system 102.

As depicted in FIG. 1, the lidar system 102 emits transmit signals 114-1 and 114-2 in the field-of-view 106. The lidar system 102 maintains an alternating pattern of power levels, which includes a first power level and a second power level. For example, the lidar system 102 emits the transmit signal 114-1 toward the object 108-1 with the first power level. The lidar system 102 then emits the transmit signal 114-2 toward the object 108-2 with the second power level. The first power level is lower than the second power level, which is represented by the amplitude of the pulse of the transmit signal 114-1 and the transmit signal 114-2. The alternating pattern of power levels is effective to limit a total power level emitted by the lidar system during consecutive pixels.

The lidar system 102 can also measure reflective properties of the objects 108-1 and 108-2 based on the energy of the received signals. Information about this energy can be used to classify the objects 108-1 and 108-2. As an example, the lidar system 102 can determine whether the object 108-2 is a parked vehicle 112-6, a lane marker, a surface of a road, or a human 110-3. The energy information also enables the lidar system 102 to determine a characteristic of the objects 108-1 and 108-2, including a material composition of the objects 108-1 and 108-2. The lidar system 102 and the vehicle 104 are further described with respect to FIG. 2.

FIG. 2 illustrates the lidar system 102 as part of the vehicle 104. The vehicle 104 also includes at least one vehicle-based system 202 that rely on data from the lidar system 102, including a driver-assistance system 204 and an autonomous-driving system 206. Generally, the vehicle-based systems 202 use lidar data provided by the lidar system 102 to perform a function. For example, the driver-assistance system 204 provides blind-spot monitoring and generates an alert that indicates a potential collision with an object 108 that is detected by the lidar system 102. In this case, the lidar data from the lidar system 102 indicates when it is safe or unsafe to change lanes. The autonomous-driving system 206 may move the vehicle 104 to a particular location on the road while avoiding collisions with objects 108 detected by the lidar system 102. The lidar data provided by the lidar system 102 can provide information about distance and reflectivity of the objects 108 to enable the autonomous-driving system 206 to perform emergency braking, perform a lane change, or adjust the speed of the vehicle 104.

The lidar system 102 includes a communication interface 208 to transmit the lidar data to the vehicle-based systems 202 or another component of the vehicle 104. The communication interface 208 can transmit the data over a communication bus of the vehicle 104, for example, when the individual components of the lidar system 102 are integrated within the vehicle 104. In general, the lidar data provided by the communication interface 208 is in a format usable by the vehicle-based systems 202. In some implementations, the communication interface 208 can send information to the lidar system 102, including the speed of the vehicle 104 or whether a turn blinker is on or off. The lidar system 102 uses this information to configure itself appropriately. For example, the lidar system 102 can adjust its frame rate or scanning speed based on the speed of the vehicle 104. Alternatively, the lidar system 102 can dynamically adjust the field-of-view 106 based on whether a right-turn blinker or a left-turn blinker is on.

The lidar system 102 also includes a transmitter 210 to transmit lidar signals and a receiver 212 to receive reflected versions of these lidar signals. The transmitter 210 includes elements, whether optical or otherwise, for emitting lidar signals, which can include a laser driver and laser diodes, and related components for directing the lidar signals. The receiver 212 includes one or more photodetector arrays (collectively, referred to as a photodetector) to detect the reflected lidar signals. The transmitter 210 and the receiver 212 can be incorporated together on the same integrated circuit (e.g., a transceiver integrated circuit) or separately on different integrated circuits.

The lidar system 102 includes a power control module 214 for controlling the power level of lidar signals emitted by the transmitter 210. The power control module 214 can be implemented using hardware, software, firmware, or a combination thereof. In some implementations, the power control module 214 is incorporated within the transmitter 210 and implemented on the same integrated circuit. In other implementations, the power control module 214 can be separate from the transmitter 210 and implemented on a different integrated circuit (or multiple integrated circuits), and in some implementations, at least a portion of the power control module 214 can be implemented by a processor 218. The power control module 214 can control components of the transmitter 214 to maintain an alternating pattern of power levels in the emitted lidar signals. The maintenance of the alternating pattern of power levels is discussed in greater detail with respect to FIG. 4.

The lidar system 102 also includes one or more processors 218 and computer-readable storage media (CRM) 216. The processor 218 can be implemented as a microprocessor or a system-on-chip. The processor 218 executes instructions that are stored within the CRM 216. As an example, the processor 218 can determine a location of the object 108 (of FIG. 1) relative to the lidar system 102 (e.g., determine a slant range, azimuth, and elevation to the object 108), determine the material composition of the object 108, or classify the object 108. As another example, the processor 218 can provide instructions to the power control module 214 to control characteristics of the alternating pattern of power levels (e.g., the first power level, the second power level, the number of alternating power levels). The processor 218 also generates lidar data for the vehicle-based systems 202.

FIG. 3-1 illustrates an example operation of the lidar system 102 with alternating power-level scanning. In the environment 300 of FIG. 3-1, objects 108-11 and 108-21 (collectively, the objects 108) are located at a particular range and angle from the lidar system 102. To detect the objects 108, the lidar system 102 emits a transmit signal 302 for each of the pixels 306.

As a reference, FIG. 3-2 illustrates the pixels 306 of the field-of-view 106 scanned by the lidar system 102 during a frame (not shown). The field-of-view 106 includes the pixels 306-11, 306-21, 306-31, 306-X1, 306-12, 306-22, 306-32, 306-X2, 306-XY, 306-3Y, 306-2Y, 306-1Y, and all other pixels scanned during the frame. The pixels 306 are shown arranged in an X-pixel-wide-by-Y-pixel-high grid and are scanned individually in the order indicated by the arrows, one row (or column) at a time, although other orders for scanning the pixels 306 are possible.

Referring back to FIG. 3-1, the transmit signal 302 includes a single pulse 308. In other implementations, the transmit signal 302 can include multiple pulses, such as pulses 308-1 to 308-N in a pulse train, where N represents a positive integer. The lidar system 102 can tailor the number of pulses 308 for each of the transmit signals 302 and the transmission characteristics of the pulses 308 (e.g., pulse width, time interval between each pulse 308, energy level) to achieve a particular scanning speed, detection range, or range resolution.

The lidar system 102 sequentially scans the pixels 306 within the field-of-view 106. A frame (not shown) represents the time it takes to scan all the individual pixels 306 within the field-of-view 106.

In the depicted example, the lidar system 102 emits transmit signals 302-11 and 302-21, for the pixels 306-11 and 306-21, respectively. The transmit signals 302-11 and 302-21 are collectively the transmit signal 302. A first power level of the transmit signal 302-11 is greater than a second power level of the transmit signal 302-21. The first power level is greater than the second power level, which is depicted in FIG. 3-1 by the pulse amplitude of the transmit signal 302-11 being larger than the pulse amplitude of the transmit signal 302-21. The alternating pattern of power levels is effective to configure the lidar system 102 to alternative between a long-range detection capability and a short-range detection capability. In this example, the first power level is associated with the long-range detection capability and the transmit signal 302-11 is capable of detecting the object 108-11. In contrast, the transmit signal 302-21, which has the second power level, may not be as capable of detecting the object 108-11 as the transmit signal 302-11. The transmit signal 302-21 is capable of detecting the object 108-21, which is closer to the lidar system 102 than the object 108-11.

At least a portion of the transmit signal 302-11 is reflected by the object 108-11. The reflected portion represents a return signal 304-11. The lidar system 102 receives the return signal 304-11 and processes the return signal 304-11 to extract lidar data regarding the object 108-1 for the vehicle-based systems 202. As depicted, the amplitude of the return signal 304-11 is smaller than the amplitude of the transmit signal 302-11 due to losses incurred during propagation and reflection.

Similarly, at least a portion of the transmit signal 302-21 is reflected by the object 108-21. The return signals 304-11 and 304-21 are collectively the return signal 304. The lidar system 102 receives the return signal 304-21 and processes it to extract lidar data regarding the object 108-21 for the vehicle-based systems 202.

At the lidar system 102, the return signals 304-11 and 304-21 represent a delayed version of the transmit signals 302-11 and 302-21, respectively. The amount of delay is proportional to the range (e.g., distance) from the objects 108-11 and 108-21 to the lidar system 102. For example, the delay represents the time it takes the transmit signal 302-11 to propagate from the lidar system 102 to the object 108-11 and for the return signal 304-11 to travel back to the lidar system 102. The transmission of the transmit signals 302 by the lidar system 102 is described in more detail with respect to FIG. 4.

Figure 4:
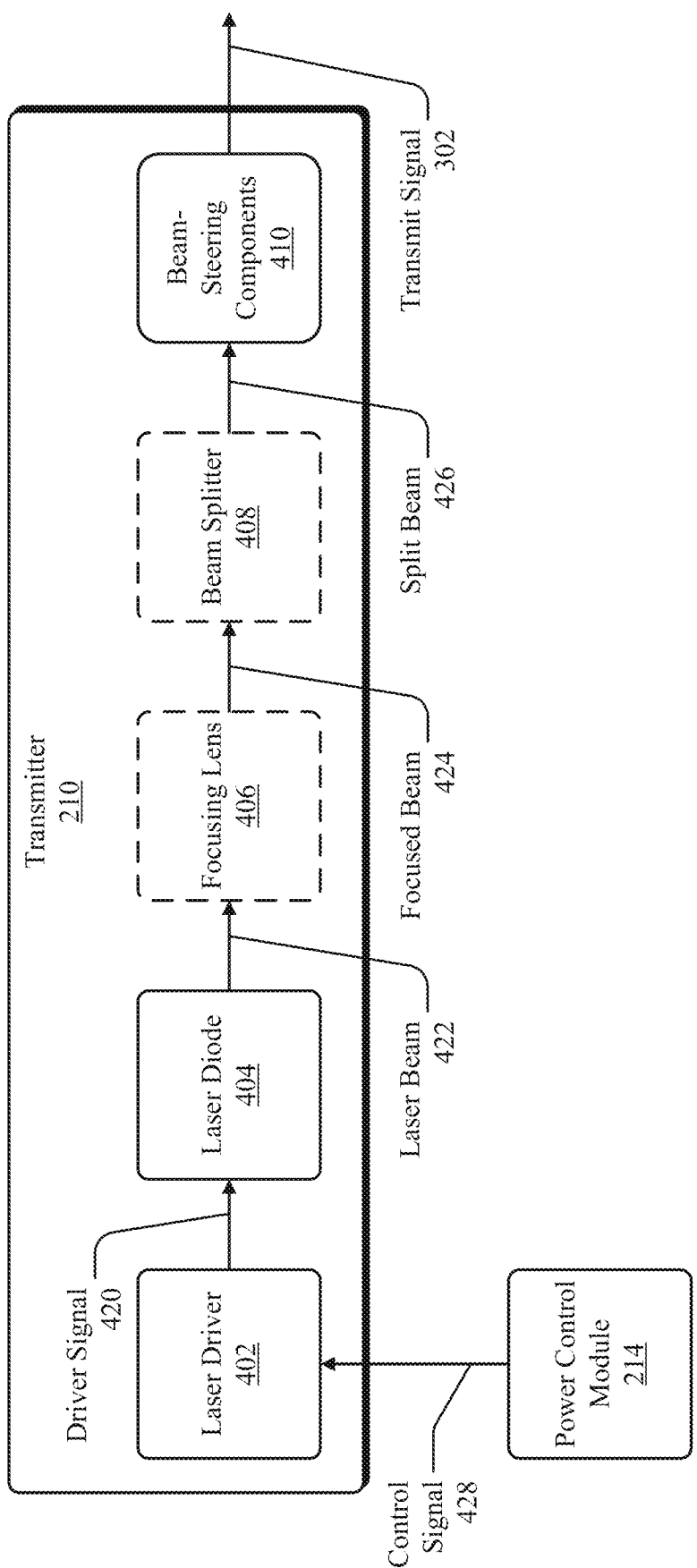
FIG. 4 illustrates an example transmitter of the described ToF lidar system.

FIG. 4 illustrates an example transmitter 210 of the lidar system 102. In the depicted configuration, the transmitter 210 includes a laser driver 402, a laser diode 404, a focusing lens 406, a beam splitter 408, and beam-steering components 410. In some implementations, the focusing lens 406 and the beam splitter 408 can be omitted from the transmitter 210. Although not explicitly shown, the transmitter 210 can include other components, including the power control module 214.

The power control module 214 provides a control signal 428 to the laser driver 402. The control signal 428 can direct operations of the laser driver 402 to maintain an alternating pattern of power levels emitted by the lidar system 102. The power control module 214 can generate the control signal 428 based on instructions received from the processor 218 or instructions stored in the CRM 216.

The laser driver 402 drives the laser diode 404 by providing a current in a driver signal 420. The laser driver 402, based on the control signal 428, can vary the current level of the driver signal 420, the pulse width of the driver signal 420, or a combination thereof to adjust the power level of the transmit signal 302 and maintain an alternating pattern of power levels. In some implementations, the laser driver 402 can drive the laser diode 404 by providing a voltage signal as the driver signal 420.

The laser diode 404 creates a laser beam 422. The laser diode 404 converts electrical energy in the driver signal 420 into light, which is emitted as the laser beam 422. The driver signal 420 controls the power level of the laser beam 422 output by the laser diode 404.

The focusing lens 406 forms a focused beam 424. In some implementations, the laser beam 422 can diverge rapidly after leaving the laser diode 404. The focusing lens 406 can focus or collimate the laser beam 422 into the focused beam 424. The focused beam 424 can be wide or narrow. The beam splitter 408 can split the focused beam 424 in two, which includes a split beam 426 and another beam (not illustrated). The other beam can be an input to the processor 218 to assist in determining characteristics of the object 108.

The beam-steering components 410 can include mechanical and/or electromechanical components to shape or steer the split beam 426 into the transmit signal 302. Using the beam-steering components 410, the transmitter 210 can steer and shape the transmit signal 302 through various optical beamforming techniques.

The beam-steering components 410 can include mechanical components. In which case, the beam-steering components 410 include high-grade optics and a rotating assembly to create a wide (e.g., three-hundred-sixty degree) field-of-view 106. Alternatively, the lidar system 102 can be a solid-state lidar system, such as a microelectromechanical-system (MEMS)-based lidar system, a flash-based lidar system, or an optical phased-array lidar system. When configured as a solid-state lidar system, the beam-steering components 410 do not include a rotating mechanical component and may, therefore, be less expensive than a mechanical-scanning lidar system.

The lidar system 102 can include multiple solid-state lidar modules, with each module positioned at a different location on the vehicle 104. For example, the modules may be on the front, rear, or sides of the vehicle 104 and, when combined, create a single point cloud. In such an arrangement, the lidar system 102 has a field-of-view 106 that is similar to the field-of-view 106 of a mechanical-scanning lidar system.

During operation, the laser driver 402 outputs the driver signal 420 to the laser diode 404. As described above, the laser driver 402 can vary the current or pulse width of the driver signal 420 to adjust the power level of the laser beam 422, which is output by the laser diode 404. The focusing lens 406 can collimate the laser beam 422 to produce the focused beam 424. The beam splitter 408 can split the laser beam 422 or the focused beam 424 in two, which includes the split beam 426. The beam-steering components 410, based on the laser beam 422, the focused beam 424, or the split beam 426, emit the transmit signal 302.

Figure 5:
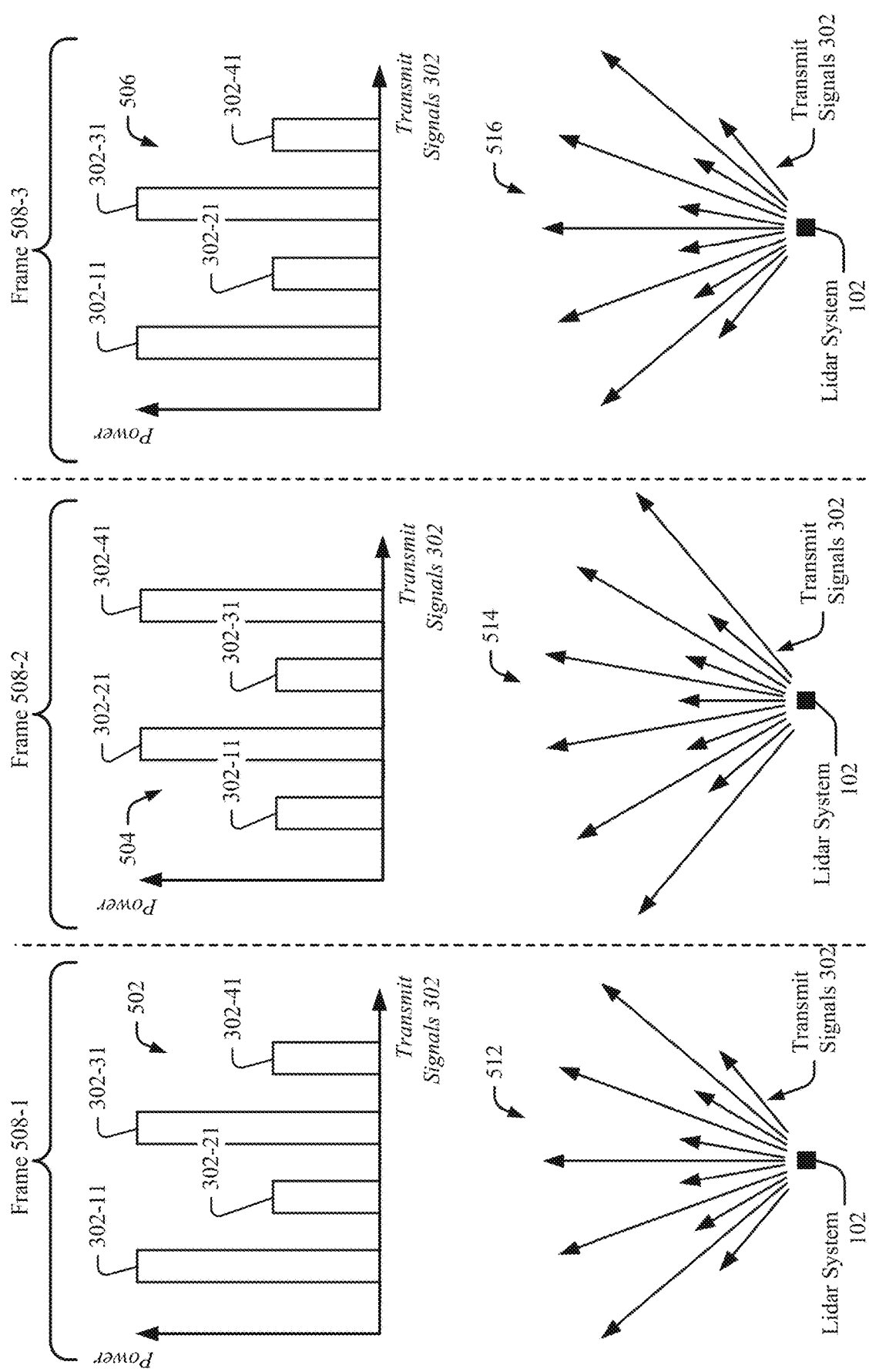
FIG. 5 illustrates example transmit signals with alternating power levels emitted by a ToF lidar system.

FIG. 5 illustrates example transmit signals 302 with alternating power levels emitted by the lidar system 102. The transmitter 210 of the lidar system 102 emits the transmit signals 302-11, 302-21, 302-31, and 302-41 for the pixels 306-11, 306-21, 306-31, and 306-41, respectively. In the depicted example, the transmit signals 302 include a single pulse 308. During each of the frames 508, the power level of the transmit signals 302 alternates from a high-power level to a low-power level for consecutive pixels 306. In FIG. 5, the power level of the transmit signals 302 is indicated by the amplitude of the pulses 308 in the charts 502, 504, and 506 and by the length of the lines in the illustrations 512, 514, and 516. The order of the alternating pattern of power levels is switched for consecutive frames 508. For example, the power level of the transmit signal 302-11 for the pixel 306-11 is high for an initial frame (e.g., the frame 508-1) of consecutive frames and low for the subsequent frame (e.g., the frame 508-2). The high power level is associated with a long detection range and the low power level is associated with a short detection range.

For the frames 508-1 and 508-3, the power level of the transmit signals 302-11 and 302-31 is greater than the power level of the transmit signals 302-21 and 302-41. In other words, the transmit signals 302-11 and 302-31 are at the high-power level and the transmit signals 302-21 and 302-41 are at the low-power level. In the depicted example, the transmit signals 302-11 and 302-31 have approximately twice the power as the transmit signals 302-21 and 302-41. In other implementations, the high-power level can be approximately three, four, or five times the low-power level. In yet other implementations, the high-power level and the low-power level can be fractions of a regulatory limit (e.g., 75% and 25% of the limit, respectively), with the high-power level being larger than the low-power level.

For the frame 508-2, the power level of the transmit signals 302-21 and 302-41 is greater than the power level of the transmit signals 302-11 and 302-31. In other words, the transmit signals 302-11 and 302-31 are at the low-power level and the transmit signals 302-21 and 302-41 are at the high-power level.

In other implementations, the alternating pattern of power levels can alternate between three or more power levels for consecutive pixels. For example, the power level of the transmit signals 302-11 and 302-41 for the frame 508-1 is a first power level. The power level of the transmit signal 302-21 is a second power level, and the power level of the transmit signal 302-31 is a third power level. For the frame 508-2, the transmit signals 302-11 and 302-41 are at the third power level, the transmit signal 302-21 is at the first power level, and the transmit signal 302-31 is at the second power level. For the frame 508-3, the transmit signals 302-11 and 302-41 are at the second power level, the transmit signal 302-21 is at the third power level, and the transmit signal 302-31 is at the first power level.

Example Method

Figure 6:
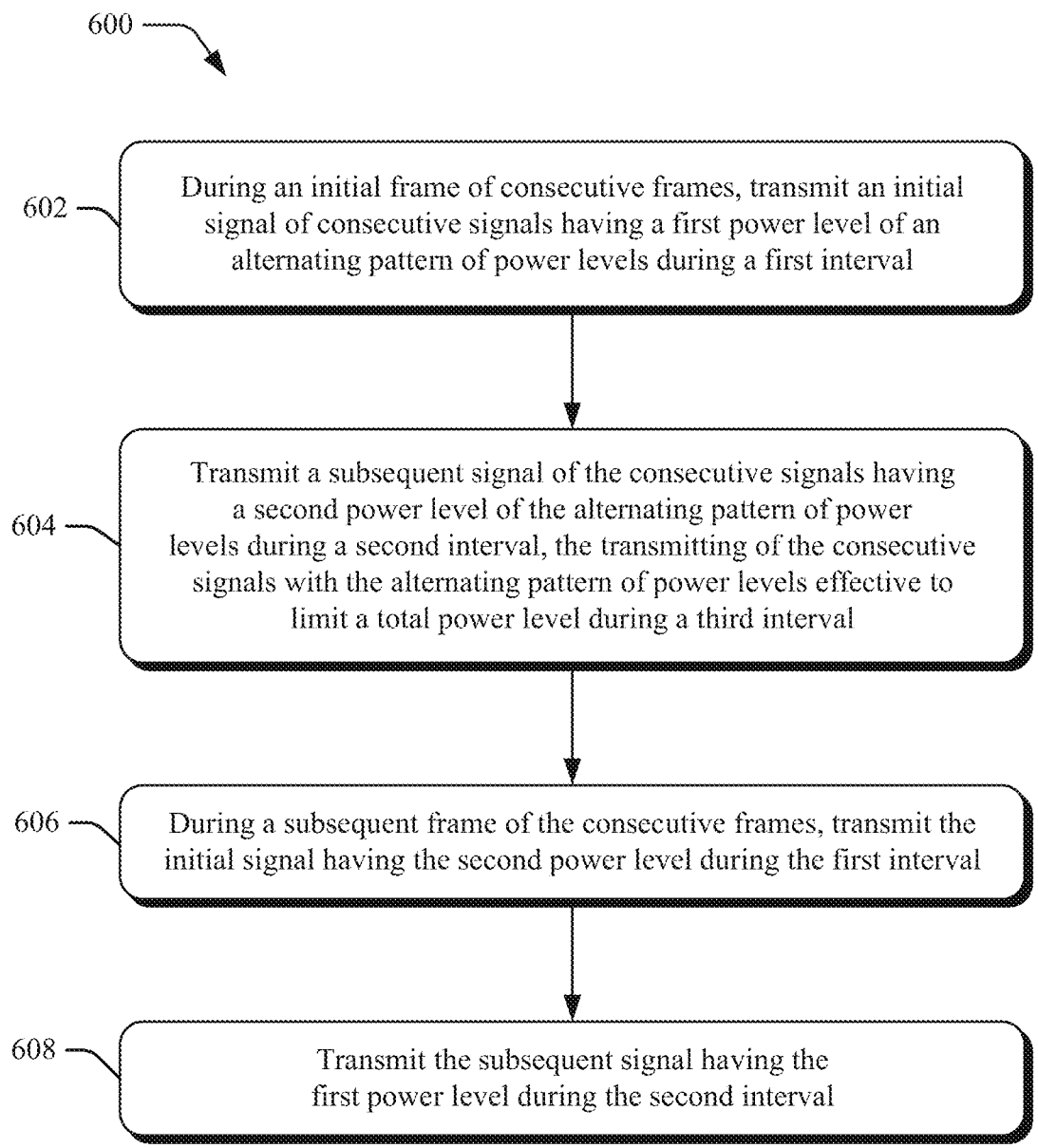
FIG. 6 illustrates an example method of alternating power-level scanning performed by a ToF lidar system.

FIG. 6 depicts an example method 600 of alternating power-level scanning performed by the lidar system 102. Method 600 is shown as sets of operations (or acts) performed, but not necessarily limited to the order or combinations in which the operations are shown herein. Further, any one or more of the operations may be repeated, combined, or reorganized to provide other methods. In portions of the following discussion, reference may be made to the environments 100 and 300 of FIGS. 1 and 3-1, respectively, and entities detailed in FIGS. 1 through 5, reference to which is made for example only. The techniques are not limited to performance by one entity or multiple entities.

At 602, during an initial frame of consecutive frames, an initial signal of consecutive signals is transmitted. The initial signal has a first power level of an alternating pattern of power levels and is transmitted during a first interval. The first interval is associated with an initial pixel of consecutive pixels. For example, during the frame 508-1, the transmitter 210 of the lidar system 102 on the vehicle 104 transmits the transmit signal 302-11, as illustrated in FIG. 5. The transmit signal 302-11 has a first power level of an alternating pattern of power levels. The transmit signal 302-11 is transmitted during a first time interval, which is associated with the pixel 306-11.

At 604, a subsequent signal of the consecutive signals having a second power level of the alternating pattern of power levels is transmitted. The subsequent signal is transmitted during a second interval, which is associated with a subsequent pixel of the consecutive pixels. The transmitting of the consecutive signals with the alternating pattern of power levels is effective to limit a total power during a third interval, which includes at least a portion of the first interval and at least a portion of the second interval. For example, the transmitter 210 transmits the transmit signal 302-21, as illustrated in FIG. 5. The transmit signal 302-21 has a second power level of the alternating pattern of power levels. The transmit signal 302-21 is transmitted during a second time interval, which is associated with the pixel 306-21. The transmitting of the consecutive transmit signals 302-11 and 302-21 with the alternating pattern of power levels is effective to limit a total power level during a third interval, which includes at least a portion of the first interval and at least a portion of the second interval. The power control module 214 can control the laser driver 402 of the transmitter 210 to maintain the alternating pattern of power levels.

At 606, during a subsequent frame of the consecutive frames, the initial signal having the second power level is transmitted. The initial signal is transmitted during the first interval. For example, during the frame 508-2, the transmitter 210 transmits the transmit signal 302-11, as illustrated in FIG. 5. The transmit signal 302-11 has the second power level and is transmitted during the first interval.

At 608, the subsequent signal having the first power level is transmitted. The subsequent signal is transmitted during the second interval. For example, the transmitter 210 transmits the transmit signal 302-21, as illustrated in FIG. 5. The transmit signal 302-21 has the first power level and is transmitted during the second interval.

EXAMPLES

In the following section, examples are provided.

Example 1

A method comprising: maintaining, by a time-of-flight lidar system, an alternating pattern of power levels including a first power level and a second power level; and during an initial frame of consecutive frames: transmitting, using the lidar system, an initial signal of consecutive signals during a first interval, the initial signal having the first power level from the alternating pattern of power levels and being associated with an initial pixel of consecutive pixels; and transmitting a subsequent signal of the consecutive signals during a second interval, the subsequent signal having the second power level from the alternating pattern of power levels and being associated with a subsequent pixel of the consecutive pixels, the transmitting of the consecutive signals with the alternating pattern of power levels effective to limit a total power level emitted by the lidar system during a third interval, the third interval comprising at least a portion of the first interval and at least a portion of the second interval.

Example 2

The method of example 1, the method further comprising: during a subsequent frame of the consecutive frames: transmitting the initial signal during the first interval, the initial signal having the second power level; and transmitting the subsequent signal during the second interval, the subsequent signal having the first power level.

Example 3

The method of example 1, wherein: the first power level is associated with a first detection range; and the second power level is associated with a second detection range, the alternating pattern of power levels further effective to configure the lidar system to alternate between detecting objects at the first detection range and the second detection range.

Example 4

The method of example 3, wherein: the first power level is less than the second power level; and the first detection range is less than the second detection range.

Example 5

The method of example 1, wherein a power control module provides a control signal to a laser driver of the lidar system to maintain the alternating pattern of power levels.

Example 6

The method of example 5, wherein: the first power level is associated with at least one of a first current level or a first pulse width of the laser driver; and the second power level is associated with at least one of a second current level or a second pulse width of the laser driver, wherein the second current level is different than the first current level and the first pulse width is different than the second pulse width.

Example 7

The method of example 1, wherein the total power level during the third time interval is less than a safety regulation limit for the lidar system.

Example 8

The method of example 7, wherein the first power level is approximately seventy-five percent of the safety regulation limit and the second power level is approximately twenty-five percent of the safety regulation limit.

Example 9

The method of example 1, wherein the first power level is at least twice as large as the second power level.

Example 10

The method of example 1, wherein the initial signal and the subsequent signal each comprise one pulse.

Example 11

A transmitter of a time-of-flight lidar system configured to: maintain an alternating pattern of power levels including a first power level and a second power level; and during an initial frame of consecutive frames: transmit an initial signal of consecutive signals during a first interval, the initial signal having the first power level from the alternating pattern of power levels and being associated with an initial pixel of consecutive pixels; and transmit a subsequent signal of the consecutive signals during a second interval, the subsequent signal having the second power level from the alternating pattern of power levels and being associated with a subsequent pixel of the consecutive pixels, the transmitting of the consecutive signals with the alternating pattern of power levels effective to limit a total power level emitted by the lidar system during a third interval, the third interval comprising at least a portion of the first interval and at least a portion of the second interval.

Example 12

The transmitter of example 11, wherein the transmitter is further configured to: during a subsequent frame of the consecutive frames: transmit the initial signal during the first interval, the initial signal having the second power level; and transmit the subsequent signal during the second interval, the subsequent signal having the first power level.

Example 13

The transmitter of example 11, wherein: the first power level is associated with a first detection range; and the second power level is associated with a second detection range, the alternating pattern of power levels further effective to configure the lidar system to alternate between detecting objects at the first detection range and the second detection range.

Example 14

The transmitter of example 13, wherein: the first power level is less than the second power level; and the first detection range is less than the second detection range.

Example 15

The transmitter of example 11, wherein the transmitter is further configured to: provide, by a power control module, a control signal to a laser driver of the transmitter to maintain the alternating pattern of power levels; wherein the first power level is associated with at least one of a first current level or a first pulse width of the laser driver; and the second power level is associated with at least one of a second current level or a second pulse width of the laser driver, wherein the second current level is different than the first current level and the first pulse width is different than the second pulse width.

Example 16

The transmitter of example 11, wherein the total power level during the third time interval is less than a safety regulation limit for the lidar system.

Example 17

The transmitter of example 16, wherein the first power level is approximately seventy-five percent of the safety regulation limit and the second power level is approximately twenty-five percent of the safety regulation limit.

Example 18

The transmitter of example 11, wherein the first power level is at least twice as large as the second power level.

Example 19

The transmitter of example 11, wherein the lidar system is a lidar system of an automobile.

Example 20

A transmitter of a time-of-flight lidar system configured to: during a first frame of consecutive frames: transmit a first signal of consecutive signals during a first interval, the first signal having a first power level of an alternating pattern of power levels and being associated with a first pixel of consecutive pixels; transmit a second signal of the consecutive signals during a second interval, the second signal having a second power level of the alternating pattern of power levels and being associated with a second pixel of the consecutive pixels; and transmit a third signal of the consecutive signals during a third interval, the third signal having a third power level of the alternating pattern of power levels and being associated with a third pixel of the consecutive pixels; during a second frame of the consecutive frames: transmit the first signal during the first interval, the first signal having the second power level and being associated with the first pixel; transmit the second signal during the second interval, the second signal having the third power level and being associated with the second pixel; and transmit the third signal during the third interval, the third signal having the first power level and being associated with the third pixel; and during a third frame of the consecutive frames: transmit the first signal during the first interval, the first signal having the third power level and being associated with the first pixel; transmit the second signal during the second interval, the second signal having the first power level and being associated with the second pixel; and transmit the third signal during the third interval, the third signal having the second power level and being associated with the third pixel, the transmitting of the consecutive signals with the alternating pattern of power levels effective to limit a total power level emitted by the lidar system during a fourth interval, the fourth interval comprising at least a portion of the first interval, the second interval, and at least a portion of the third interval.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
   maintaining, by a time-of-flight lidar system, an alternating pattern of power levels including a first power level and a second power level;
   during an initial frame of consecutive frames:
      transmitting, using the lidar system, an initial signal of consecutive signals during a first interval, the initial signal having the first power level from the alternating pattern of power levels and being associated with an initial pixel of consecutive pixels; and
      transmitting a subsequent signal of the consecutive signals during a second interval, the subsequent signal having the second power level from the alternating pattern of power levels and being associated with a subsequent pixel of the consecutive pixels, wherein the transmitting of the consecutive signals with the alternating pattern of power levels is effective to limit a total power level emitted by the lidar system during a third interval, the third interval comprising at least a portion of the first interval and at least a portion of the second interval; and
   during a subsequent frame of the consecutive frames:
      transmitting the initial signal during the first interval, the initial signal having the second power level and being associated with the initial pixel; and
      transmitting the subsequent signal during the second interval, the subsequent signal having the first power level and being associated with the subsequent pixel.

2. The method of claim 1, wherein:
   the first power level is associated with a first detection range; and
   the second power level is associated with a second detection range, the alternating pattern of power levels further effective to configure the lidar system to alternate between detecting objects at the first detection range and the second detection range.

3. The method of claim 2, wherein:
   the first power level is less than the second power level; and
   the first detection range is less than the second detection range.

4. The method of claim 1, wherein a power control module provides a control signal to a laser driver of the lidar system to maintain the alternating pattern of power levels.

5. The method of claim 4, wherein:
   the first power level is associated with at least one of a first current level or a first pulse width of the laser driver; and
   the second power level is associated with at least one of a second current level or a second pulse width of the laser driver, wherein the second current level is different than the first current level and the first pulse width is different than the second pulse width.

6. The method of claim 1, wherein the total power level during the third interval is less than a safety regulation limit for the lidar system.

7. The method of claim 6, wherein the first power level is approximately seventy-five percent of the safety regulation limit and the second power level is approximately twenty-five percent of the safety regulation limit.

8. The method of claim 1, wherein the first power level is at least twice as large as the second power level.

9. The method of claim 1, wherein the initial signal and the subsequent signal each comprise one pulse.

10. A transmitter of a time-of-flight lidar system configured to:
    maintain an alternating pattern of power levels including a first power level and a second power level;
    during an initial frame of consecutive frames:
       transmit an initial signal of consecutive signals during a first interval, the initial signal having the first power level from the alternating pattern of power levels and being associated with an initial pixel of consecutive pixels; and
       transmit a subsequent signal of the consecutive signals during a second interval, the subsequent signal having the second power level from the alternating pattern of power levels and being associated with a subsequent pixel of the consecutive pixels, wherein the transmitting of the consecutive signals with the alternating pattern of power levels is effective to limit a total power level emitted by the lidar system during a third interval, the third interval comprising at least a portion of the first interval and at least a portion of the second interval; and
    during a subsequent frame of the consecutive frames:
       transmit the initial signal during the first interval, the initial signal having the second power level and being associated with the initial pixel; and
       transmit the subsequent signal during the second interval, the subsequent signal having the first power level and being associated with the subsequent pixel.

11. The transmitter of claim 10, wherein:
    the first power level is associated with a first detection range; and
    the second power level is associated with a second detection range, the alternating pattern of power levels further effective to configure the lidar system to alternate between detecting objects at the first detection range and the second detection range.

12. The transmitter of claim 11, wherein:
    the first power level is less than the second power level; and
    the first detection range is less than the second detection range.

13. The transmitter of claim 10, wherein the transmitter is further configured to:
provide, by a power control module, a control signal to a laser driver of the transmitter to maintain the alternating pattern of power levels; wherein
the first power level is associated with at least one of a first current level or a first pulse width of the laser driver; and
the second power level is associated with at least one of a second current level or a second pulse width of the laser driver, wherein the second current level is different than the first current level and the first pulse width is different than the second pulse width.

14. The transmitter of claim 10, wherein the total power level during the third interval is less than a safety regulation limit for the lidar system.

15. The transmitter of claim 14, wherein the first power level is approximately seventy-five percent of the safety regulation limit and the second power level is approximately twenty-five percent of the safety regulation limit.

16. The transmitter of claim 10, wherein the first power level is at least twice as large as the second power level.

17. The transmitter of claim 10, wherein the lidar system is a lidar system of an automobile.

18. A transmitter of a time-of-flight lidar system configured to:
during a first frame of consecutive frames:
transmit a first signal of consecutive signals during a first interval, the first signal having a first power level of an alternating pattern of power levels and being associated with a first pixel of consecutive pixels;
transmit a second signal of the consecutive signals during a second interval, the second signal having a second power level of the alternating pattern of power levels and being associated with a second pixel of the consecutive pixels; and
transmit a third signal of the consecutive signals during a third interval, the third signal having a third power level of the alternating pattern of power levels and being associated with a third pixel of the consecutive pixels;
during a second frame of the consecutive frames:
transmit the first signal during the first interval, the first signal having the second power level and being associated with the first pixel;
transmit the second signal during the second interval, the second signal having the third power level and being associated with the second pixel; and
transmit the third signal during the third interval, the third signal having the first power level and being associated with the third pixel; and
during a third frame of the consecutive frames:
transmit the first signal during the first interval, the first signal having the third power level and being associated with the first pixel;
transmit the second signal during the second interval, the second signal having the first power level and being associated with the second pixel; and
transmit the third signal during the third interval, the third signal having the second power level and being associated with the third pixel,
the transmitting of the consecutive signals with the alternating pattern of power levels effective to limit a total power level emitted by the lidar system during a fourth interval, the fourth interval comprising at least a portion of the first interval, the second interval, and at least a portion of the third interval.

* * * * *